Jan. 16, 1968   M. JAKUBOWSKI   3,364,342
FLUID PRESSURE CONTROL APPARATUS
Filed Dec. 19, 1966   2 Sheets-Sheet 1

INVENTOR
MAREK JAKUBOWSKI
BY *K. P. Johnson*
ATTORNEY

Jan. 16, 1968   M. JAKUBOWSKI   3,364,342

FLUID PRESSURE CONTROL APPARATUS

Filed Dec. 19, 1966   2 Sheets-Sheet 2

United States Patent Office 3,364,342
Patented Jan. 16, 1968

3,364,342
FLUID PRESSURE CONTROL APPARATUS
Marek Jakubowski, Endwell, N.Y., assignor to International Business Machines Corporation, Armonk, N.J., a corporation of New York
Filed Dec. 19, 1966, Ser. No. 602,665
9 Claims. (Cl. 235—200)

ABSTRACT OF THE DISCLOSURE

Force balancing control apparatus with a reversible, incrementally adjustable force applicator and counter, for producing and responding to fluid pressure control signals in analog-to-digital and digital-to-analog conversion systems.

Background of the invention

General purpose computers are commonly used to monitor and regulate variables such as fluid pressure in industrial processes. The use of computers, however, has been predominate in the extensive or complex processes having a large number of control points because of the sizable initial computer investment. Communication between the process and computer usually requires both electrical and fluid signals so that a transformation of energy is necessary. Such transformation devices have been devised and are readily available. However, these devices are generally too expensive for use with the relatively simple processes because they have been devised as high speed devices capable of monitoring a large number of control channels for set point stations and control transducers. Where only a relatively few channels are required for control, the cost of readily available transformation devices is prohibitive and the close computer control cannot be justified. It is therefore desirable to have available inexpensive transformation equipment, since the few required check points can be monitored periodically by the computer. This permits the computer to continue at other times with the assigned data processing tasks.

Another disadvantage of the existing equipment is encountered when the computer attempts to change the current digital setting of the control apparatus.

Usually the pressure control equipment lacks a storage facility for the new digital values so that the computer is tied up until the control equipment changes the analog pressure to that dictated by the computer. The computer is thus slowed to the response speed of the process control mechanism.

Accordingly, it is a primary object of this invention to provide simplified, inexpensive process control equipment for converting analog and digital signals.

Another object of this invention is to provide signal conversion equipment which possesses a high degree of resolution, accuracy and linearity that is compatible for use with a general purpose computer.

Another object of this invention is to provide signal conversion apparatus which can be adapted to issue and receive digital signals in any of several codes.

Still another object of this invention is to provide control apparatus having a fluid pressure-actuated storage facility for parallel digital input signals and thereafter varying the analog fluid pressure output in accordance with the stored value.

A further object of this invention is to provide conversion apparatus between analog and digital signals that can be operated within a preselected range of fluid pressure.

Summary of the invention

The foregoing objects of the invention are attained through the provision of force balance means having analog and digital forces opposingly applied thereto with selectively operable, reversible adjusting means for incrementally controlling the digital force, and having a counter for generating fluid pressure output signals in a predetermined digital code in accordance with the instantaneous setting of the adjusting means. Detection means are provided to sense the departure of the force balance means from an equilibrium position and supply an appropriate signal indicating the correction required to readjust the analog and digital forces. The particular force readjusted depends upon whether the analog or digital force is controlling. Within the force balance means is a bias spring to select a predetermined pressure range for which the signal conversion is to take place.

For converting from a digital to analog value, a parallel input means is provided for the digital orders and a fluid actuated comparator is connected between the input means and force increment counter which produces a readjustment of the digital force in accordance with the input signals. In addition, the digital-to-analog apparatus includes speed control means for achieving large force changes rapidly.

The invention utilizes as a counter a plurality of apertured drums with nozzles for directing pressurized fluid streams against the drum surfaces. The drums are perforated in accordance with the particular digital code desired, such as the binary code, and pressure taps are taken from the nozzles directed at the drums to control fluid-to-electric transducers. For example, if a nozzle was directing a fluid stream through an aperture on the drum surface, the nozzle pressure would be low thus indicating that the particular binary order was registering a "1." The first drum in the series is moved in accordance with the shaft displacement of a stepper motor and, upon completing a full revolution, transmits one increment of motion to the next drum in the series through a carry pinion. This arrangement advantageously permits a reduction in the physical size of the register while providing reliable output pressure signals to a utilization device. This arrangement furthermore provides a large capacity for the counter thus providing high resolution and accuracy.

The foregoing and other objects, features and advantages of the invention will be apparent from the following more particular description of preferred embodiments of the invention as illustrated in the accompanying drawings.

Description of the preferred embodiments

Figure 1:
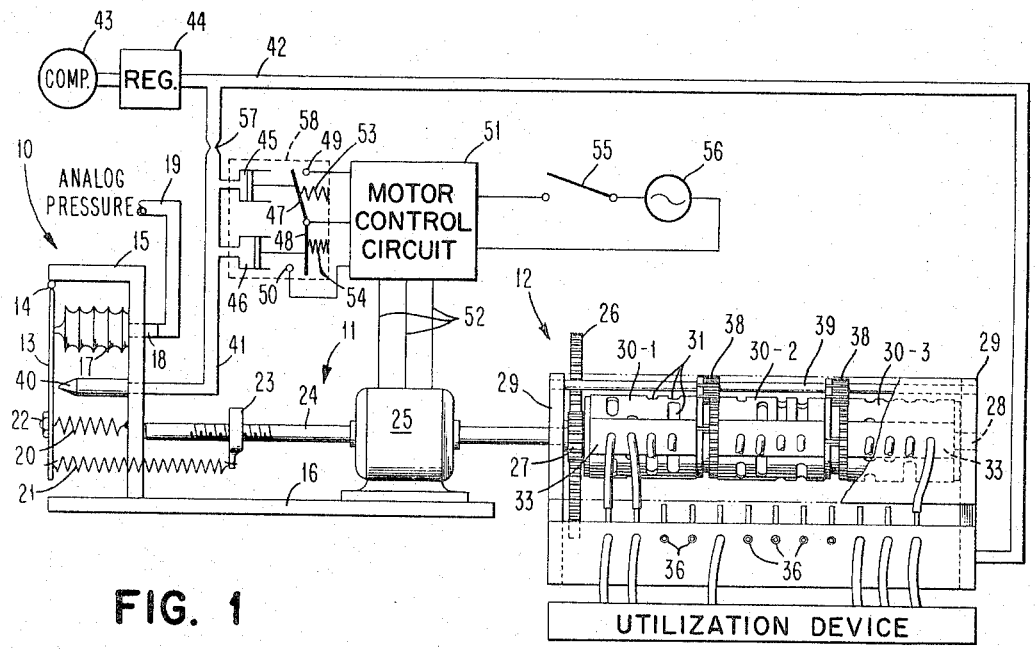
FIG. 1 is a diagram of an analog-to-digital conversion system for fluid pressure arranged in accordance with the invention.

Referring to FIG. 1, the fluid pressure control apparatus comprises generally force balance mechanism 10, force adjusting apparatus 11, and force increment counter 12. The force balance mechanism uses a beam 13 pivoted at 14 on support member 15 so as to be freely movable on the pivot. The support member 15 is fixed on base plate 16. Secured within the support member is a bellows 17 open at one end 18 for connection with duct 19 through which is continuously supplied varying fluid pressure. As the pressure within duct 19 changes, the bellows correspondingly expands or contracts urging beam 13 to move about pivot 14.

A counteracting force is applied to beam 13 by a bias spring 20 and a linear control spring 21. Bias spring 20 is a tension spring having one end secured in support member 15 and the other secured to beam 13 with an adjustable nut 22 thereon with which to vary the tension applied to beam 13. Spring 21 is also a tension spring and is secured to beam 13 and to a travelling nut 23 on threaded shaft 24. Both springs 20 and 21 urge beam 13 to swing about pivot 14 in a counterclockwise direction as seen in FIG. 1. The tension applied to the beam by spring 21 is controlled by the rotation of shaft 24 as moved by reversible electric stepper motor 25. The stepper motor is of the conventional type and is readily available commercially. Depending upon the direction of rotation of shaft 24, nut 23 can be made to move toward or away from support member 15. Also fixed to the motor is a spur gear 26 engaged with a pinion 27 affixed to a coded drum 30–1 rotatable on counter shaft 28. Because of the positive connection, whenever motor 25 moves incrementally in either direction, the motion is transmitted to the counter.

The counter shown in the illustrated embodiment produces fluid pressure output signals in accordance with a predetermined code to indicate the digital setting of the counter at any particular instant in time. The counter is shown in more detail in FIGS. 2a and 2b. Counter shaft 28 is supported at each end in upright brackets 29 and has mounted thereon for free rotation three drums 30–1, 30–2 and 30–3, each having slots 31 cut in the periphery of the drums. The slots are arranged in four tracks $2^0$, $2^1$, $2^2$ and $2^3$ on each drum, and aligned with each track is a nozzle 32 to which is supplied fluid under pressure, such as compressed air. Air is supplied to manifold 34 via a duct from regulator 44. The nozzles are supported in pressure shoes 33 which hold the nozzles closely adjacent the drum surface to prevent undue leakage of pressurized fluid between the nozzle and drum surface in the absence of any slot aligned with the nozzle. Slots 31 may be cut in the arrangement required for any particular digital code; in the embodiment shown the slots are arranged in the binary code as can be more easily seen in FIG. 2b. The figure also shows the correspondence between the slots and decimal code on a portion of the drum surface as developed.

Figure 2A:
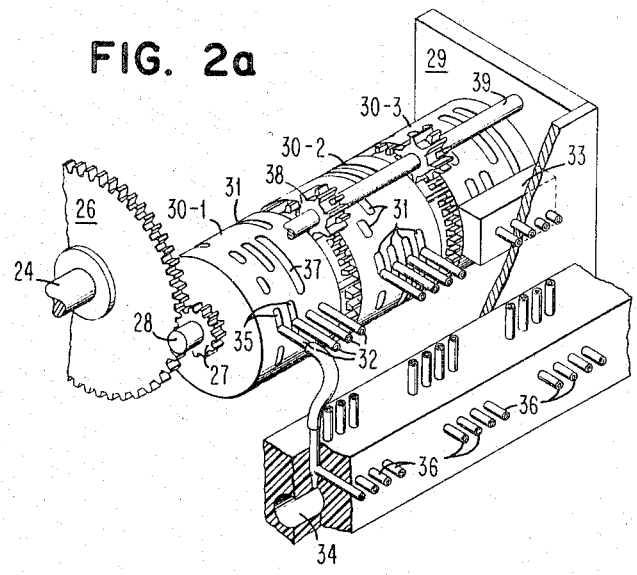
FIG. 2a is a perspective view of the counter shown in FIG. 1
Figure 2B:
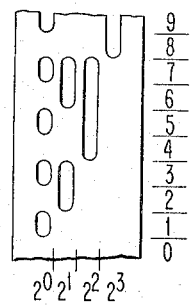
FIG. 2b is a developed view of a partial drum surface showing the aperture code.

When drive pinion 27 is rotated, the first drum 30–1 will rotate on shaft 28 so that the drum surface moves relative to nozzles 32. Assuming the drum is incrementally rotated in the clockwise direction as seen in FIG. 2a, two slots 35 will first pass in front of corresponding nozzles 32 so that the pressurized fluid may flow to atmosphere at the interior of the drum, causing a reduction of pressure in the nozzles. Therefore, pressure sensing taps 36 attached to nozzles 32 can be monitored to detect changes in the pressure within the nozzles. In the example, the pressure in the two left-most nozzles 32 will decrease while the pressure in the remaining nozzles remains high. The counter will thus indicate the binary number " . . . 000011" equivalent to a decimal "3." Upon continued rotation, slot 37 will pass in front of its corresponding nozzle 32 while slots 35 will pass beyond the nozzles for the first and second tracks. This will cause the pressure in the third nozzle from the left to decrease and the pressure in the first two nozzles will return to high pressure. The counter now indicates the binary number " . . . 000100" equivalent to a decimal "4." If desired, the drums may be positioned and moved so that "0" and "1" pressures are reversed. Each drum 30 can indicate a count from 0 through 15 in the decimal equivalent of the binary coded slots. Upon completing one revolution, drum 30–2, being coded in the same manner as the first drum, is advanced one count position by the movement of transfer pinion 38 rotatably mounted on shaft 39. Transfer pinion 38 is moved two teeth by the engagement therewith of a single tooth on drum 30–1. The capacity of the counter can thus be significantly increased by adding a plurality of drums, such as 30–2 and 30–3. Each of the drums is slotted in an identical manner and nozzles 32 are provided for each track thereon with each nozzle having a pressure sensing tap connected thereto. The counter, when arranged as shown, can be operated in both the forward or reverse directions. Continuous sensing of the pressure in nozzles 32 can take place to thereby indicate in the binary code the instantaneous setting of the counter. The outputs of the pressure sensing taps can be connected to any well-known fluid-to-electric transducer for conversion into electrical signals which are compatible with a utilization device such as a general purpose computer. The use of a stepper motor as an actuator for the counter eliminates the possibility of ambiguity since the drum cannot be partially indexed.

Referring again to FIG. 1, the force balance mechanism 10, adjusting mechanism 11, and counter 12 are arranged as an analog-to-digital converter for fluid pressures. As the varying analog fluid pressure is applied to bellows 17, beam 13 moves accordingly to counteract springs 20 and 21. The departure of the beam from a designated position is sensed by detecting the pressure of fluid within stationary nozzle 40, which is supported in bracket 15 and connected via ducts 41 and 42 to a source of pressurized fluid at compressor 43 and regulator 44. Beam 13 serves as a restriction for the flow of fluid from nozzle 40 and so that the pressure within the nozzle varies in accordance with the movement of the beam. The pressure within the nozzle is detected by a pair of piston actuators 45 and 46 in motor direction control circuit 58 and are commonly connected to duct 41. Each of the actuators is, in turn, connected to a respective switch lever 47 and 48. Each lever can complete a circuit through its respective contact 49 and 50, when closed, to actuate an oscillator at motor control circuit 51. Each of the pistons and its respective switch lever is biased with a force from an adjustable spring 53, 54 to the response pressure desired. For example, if nozzle 40 is supplied with air at a pressure of 1 p.s.i.g., then spring 53 may be set so that piston actuator 45 closes lever 47 with contact 49 at 0.6 p.s.i.g. or greater. Spring 54 may be set so that actuator 46 closes lever 48 with contact 50 at 0.5 p.s.i.g. or less. By means of the appropriate adjustment, the two piston actuators can define a narrow range of pressure which is considered an equilibrium condition at the force balance mechanism.

Circuit 51 is a conventional motor control circuit for a stepping motor which supplies electrical pulses to stepper motor 25. The motor control circuit is energized by closing switch 55 to energy source 56. The motor rotates by uniform increments in the direction of the supplied pulses. The displacement of motor shaft 24 then appropriately moves traveling nut 23 to either increase or decrease the tension in spring 21. The change in spring tension causes beam 13 to move either closer to or farther from nozzle 40 to vary the nozzle pressure accordingly. Any movement of motor shaft 24 also rotates gear 26 to move binary coded drums 30–1, 30–2 or 30–3 a corresponding amount whereby the pressure from taps 36 is changed to reflect the new digital value of force applied by spring 21 in the force balance mechanism. A restriction 57 is placed in supply duct 42 to make it possible for the pressure in duct 42 to vary according to the position of beam 13.

It will be noted that the converter arrangement of FIG. 1 can be preset by the adjustment of spring 20 and the selection of the spring constant of 21 so that only a selected range of analog pressure can be digitized without the necessity of using zero pressure as a reference. So that the counter capacity is adequate at the selected pressure range, counter 12 may be disengaged from spur gear 26 until the desired spring tension on beam 13 is obtained and then pinion 27 is again engaged with gear 26.

Figure 3:
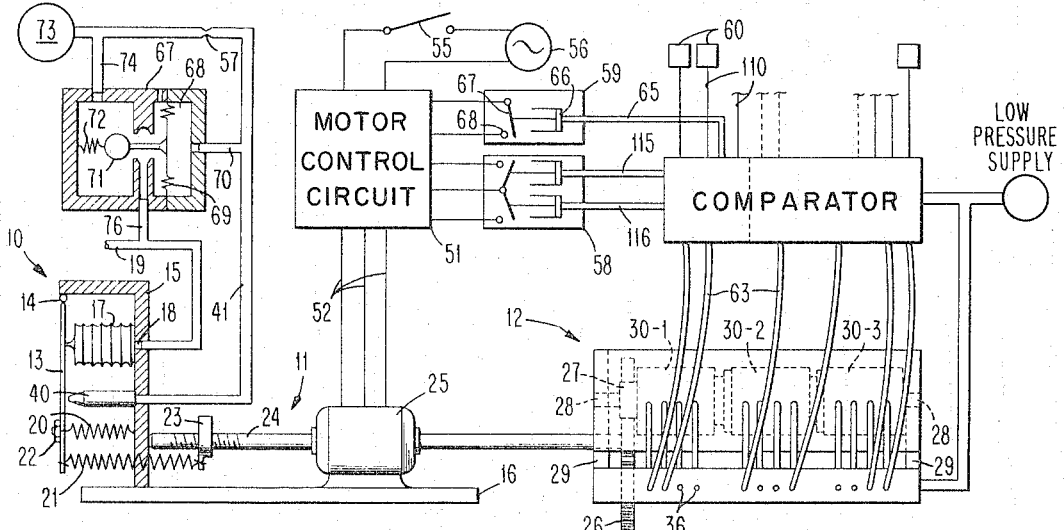
FIG. 3 is a diagram of a digital-to-analog conversion system for fluid pressure arranged in accordance with the invention.

In the embodiment of FIG. 3, the force balance mechanism 10, force adjusting mechanism 11 and counter 12 are used in a digital-to-analog converter. In this arrangement, a controlling digital input value in the required code, such as the binary code, is supplied from a source such as a computer register to valves 60. The valves may be electrically controlled to provide either a high or low pressure to the respective binary orders in fluid operated comparator 62. The second input to the comparator is provided from the pressure taps 36 from counter 12 supplied through ducts 63. The comparator in this embodiment is actuated by fluid pressure signals and will be described in more detail hereinafter in conjunction with FIGS. 4, 5a, 5b and 6. Also connected to the comparator is a direction control 58 similar to that shown and described in FIG. 1 for controlling signals generated by motor control circuit 51 to operate motor 25 in either a forward or reverse direction. In the embodiment of FIG. 3, there is, in addition to direction control circuit 58, a speed control circuit 59 which is operable to increment the stepping motor at a higher rate of speed in either the forward or reverse directions when the discrepancy between the computer and counter inputs exceeds some predetermined value.

When the comparator difference exceeds a predetermined value, a fluid pressure signal is produced in duct 65 which actuates piston 66 to close switch lever 67 and complete a circuit with contact 68. Switch lever 67 is biased to the open position in the absence of the fluid pressure signal. The circuit upon completion may perform the required function such as removing capacitance from an oscillator circuit to increase the repetition rate of the incrementing pulses produced in the motor control circuit. With this arrangement high speed circuit 59 is operable independently of the direction of motor incrementing which is controlled by circuit 58.

When any discrepancy appears in the comparator between the computer and counter inputs, the direction control circuit 58 and high speed circuit 59 are operable to produce incrementing pulses through lines 52 to motor 25 causing rotation of shaft 24 thereby moving nut 23 to the position equivalent to the digital computer input to comparator 62. As with the embodiment in FIG. 1, the movement of nut 23 alters the tension in spring 21 thereby causing beam 13 to move either closer or farther from nozzle 40. The pressure within nozzle 40 varies in turn with the movement of beam 13. Since the digital input to the comparator in FIG. 3 is controlling in this instance, a conventional fluid pressure relay 67 is controlled by the pressure within nozzle 40 and duct 41 to either accordingly increase or decrease the analog pressure in duct 19. A chamber 68 is set apart within the pressure relay by diaphragm 69 and the chamber is connected with duct 41 via a duct 70. Also secured to the diaphragm is a ball valve 71 which moves with the diaphragm. A spring 72 may be connected to the relay case and ball valve to bias the relay to the operating range desired. Pressurized fluid from source 73 is supplied through duct 74 past the ball valve 71 and out duct 76 to duct 19 leading to bellows 17 and also to the analog process being controlled. The pressure from source 73 would be slightly greater than that required for the process at duct 19.

In the event that the pressure in duct 41 decreases, diaphragm 69 moves to the right so that the ball valve 71 tends to close off the passageway leading to duct 76 from chamber 75. This action decreases the pressure supplied to duct 19 thereby reducing the force exerted by bellows 17 allowing beam 13 to swing counterclockwise around its pivot. On the other hand if the pressure in duct 41 increases, then the pressure reflected in duct 70 at chamber 68 causes diaphragm 69 to move to the left allowing more fluid to flow from chamber 75 through duct 76 to increase the pressure in duct 19. In response thereto bellows 17 produces a larger force tending to swing beam 13 clockwise about its pivot against the tension in spring 21. The pressure relay controls the amount of fluid supplied to duct 19 and exercises a corresponding control force in bellows 17 so that beam 13 seeks a null position adjacent nozzle 40. Any further change in shaft rotation of motor 25 will again cause the force balance mechanism and pressure relay to adjust to the new tension set in spring 21.

Figures 5A, 5B:
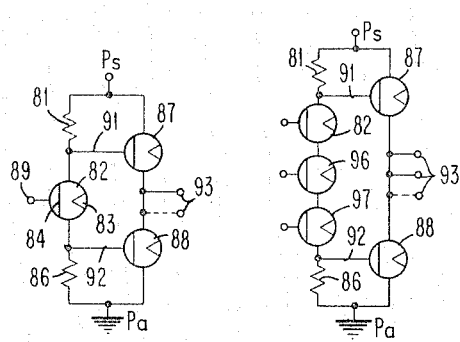
FIGS. 5a and 5b are diagrams of diaphragm controlled logical devices used in the comparator.
Figure 6:
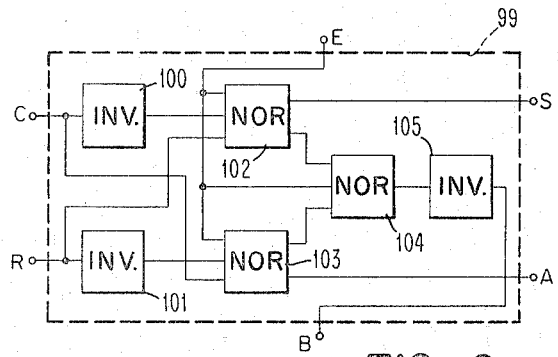
FIG. 6 is a logical block diagram for a digital order in the comparator circuit of FIG. 4.
Figure 4:
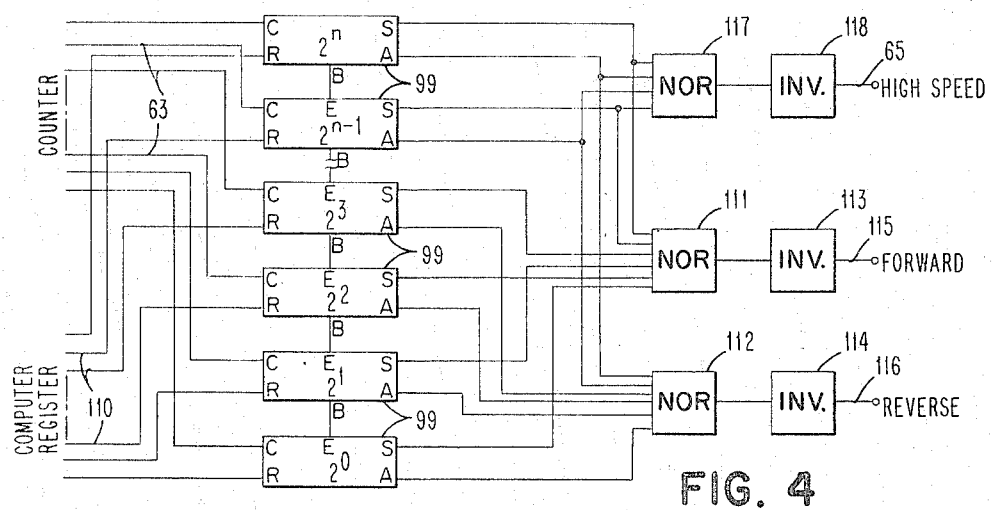
FIG. 4 is a schematic diagram of a comparator circuit for fluid pressure signals as used in the conversion system of FIG. 3.

The fluid actuated comparator 62 is schematically shown in FIG. 4 and comprises fluid logic elements shown in FIGS. 5a and 5b combined in the digital order comparing circuit shown in FIG. 6. The fluid logic elements are shown and described in the aforementioned U.S. patent application, Ser. No. 384,921 by R. E. Norwood now Patent No. 3,311,329.

Referring to FIG. 5a, the circuit element shown performs the logical invert function. Pressurized fluid from supply $P_s$ flows via a duct through fluid resistance 81 which is a flow limiting orifice in the duct, through a diaphragm chamber 82 between fixed ridge 83 and flexible diaphragm 84, and finally through a second fluid resistance 86 to atmosphere $P_a$ indicated by the symbol used to represent electrical ground potential. A parallel path of pressurized fluid $P_s$ is via a duct to diaphragm chamber 87 similar to chamber 82, and another duct to diaphragm chamber 88, thence to atmosphere. The second path uses no fluid resistances. Diaphragm chamber 82 is connected to a control duct 89 by which control signals of pressurized fluid can be applied to push flexible diaphragm 84 against ridge 83 to block fluid flow. Pressure signals are taken from the first path of device 82 through ducts 91 and 92 to control the operation of respective devices 87 and 88. The latter devices provide amplification and good drive capability for one or more output ducts 93. Resistors 81 and 86 and the area ratio of diaphragm 84 above and below ridge 83 are selected so that the diaphragm snaps closed at the desired predetermined control pressure level.

Assuming low pressure in duct 89, device 82 is open for flow. Resistances 81 and 86 are of a size to maintain the fluid pressure therebetween at approximately 60% of the supply pressure. The pressure then is sufficient in duct 92 to close the diaphragm in device 88, but insufficient to close device 87, causing the pressure in output ducts 93 to rise to the supply pressure. If a control signal is applied to duct 89 to close device 82, then the pressure in duct 91 closes the diaphragm in device 87. The pressure in duct 92 bleeds to atmosphere so that the diaphragm in device 88 opens, and the pressure in output ducts 93 also falls to atmospheric pressure. Thus a low pressure present in duct 89 produces a high pressure output level in ducts 93. Alternatively, a high pressure in duct 89 produces a low pressure signal in ducts 93. In other words, the output pressure of ducts 93 is the inverse of the input control pressures.

In FIG. 5b there is shown an element performing the logical NOR function. This element is similar to that described with regard to FIG. 5a and merely has added in the first fluid path two additional diaphragm control chambers 96 and 97. In order for a high pressure signal to appear at output ducts 93, the input signals to all control chambers 82, 96 and 97 must be low. Conversely, a control signal to any one of the control chambers, that is sufficient to close the diaphragm against the ridge therein, will produce a low pressure signal in output ducts 93.

The comparator compares fluid pressure signals between the computer inputs from valves 60 and the counter inputs from ducts 63 for each digital order, and for this comparison, uses the fluid-operated circuit 99 shown in FIG. 6. An input signal from the computer register is applied at the "R" terminal and the counter input signal is applied at the "C" terminal. The input counter and computer register signals are each inverted at respective inverters 100 and 101 whose outputs are fed to respective NOR elements 102 and 103. The input signals are also fed without inversion to nonrespective NOR elements 102 and 103 as second inputs thereto. Third inputs to NOR elements 102 and 103 are from terminal "E" which blocks the output signals of the order comparator when a higher order signals inequality. The output signals from NOR elements 102 and 103 are supplied as control signals from respective terminals "S" and "A," which respectively signal forward and reverse counting control for the stepping motor. The output signals from NOR elements 102 and 103, and any signal from terminal "E" are supplied as inputs to NOR 104 whose output is fed to inverter 105. A high output signal from 105 serves as a blocking signal at terminal "B" for the input terminal "E" of the next lower order.

In the operation of the order comparing circuit of FIG. 6, a low pressure signal is representative of a binary "1" and the high pressure signal represents a binary "0." In the instance when both the "C" and "R" inputs are both low pressure or both high pressure, signaling equality for the order, NOR elements 102 and 103 will each produce low pressure output signals at terminals 'S' and "A." These low signals indicate that the computer and counter are equal for the particular order. However, if a high pressure signal is present at terminal "E," then NOR 104 will produce a low pressure output, which is inverted at 105, and a high pressure blocking pulse signal will be present at terminal "B."

In the instance where the fluid pressure signals at terminals "C" and "R" are of opposite polarity, then either NOR 102 or 103 will provide a high pressure signal at output terminals "S" or "A." This condition presumes the absence of a high pressure input signal at "E." Any high pressure signal at terminal "E" overrides any high pressure output signal at terminals "S" or "A" since the signal at "E" indicates an inequality at a higher order position. If the input at "E" is low, then the output at "B" will be high when there is inequality.

Referring to FIG. 4, there is provided an order comparing circuit 99 for each digit order. Thus in the binary code there are provided circuits for the orders $2^0$, $2^1$, $2^2$ . . . $2^n$. Input signals are supplied on ducts 110 from valves 60 (FIG. 3) to the respective "R" inputs, and on ducts 63 from counter 12 to the respective "C" inputs. The "S" outputs from circuits 99 are connected to a common NOR element 111 which is the Forward count control and the "A" outputs are connected to a common NOR element 112 which is the Reverse count control. Since the high pressure input signals to NOR 111 and 112 produce low pressure output signals, respective inverters 113 and 114 are provided which produce high pressure control signals on ducts 115 and 116 for the piston actuators of direction control circuit 58 of FIG. 3.

As described above with regard to FIG. 3, provision is made for increasing the stepping pulse frequency to the stepping motor when large differences occur between the computer and counter amounts. The necessity of a high speed correction is detected by sensing the generation of count correcting signals at selected high order positions in the comparator circuit. Thus signals from both the "S" and "A" outputs of selected order circuits, such as $2^n$ and $2^{n-1}$, are supplied to a common NOR circuit 117. When any high pressure output signal occurs from these "S" or "A" terminals, NOR 117 supplies a low pressure signal to inverter 118 so that a high pressure signal is generated in duct 65 which moves piston actuator 66 (FIG. 3) to increase the stepping pulse frequency. High speed changes are made then in the direction for which one of the actuators of direction control circuit 58 has been operated.

From the foregoing description of comparator 62, it will be noted that the computer can simultaneously set valves 60 to, in effect, dump a digital value into the comparator which releases the computer for other purposes.

The comparator then controls the position of stepping motor 25 to seek out the value of the setting made by the computer at valves 60.

While the invention has been particularly shown and described with reference to preferred embodiments thereof, it will be understood by those skilled in the art that various changes in form and details may be made therein without departing from the spirit and scope of the invention.

What is claimed is:

1. In a fluid pressure control system, the combination comprising:
   force balance means having a varying force of fluid pressure applied thereto to urge displacement thereof in one direction and having a counteracting force applied to said balance means urging displacement in an opposite direction;
   reversible adjusting means selectively operable to change said counteracting force by adding and subtracting force increments of predetermined value; and
   rotatable drum means displaceable in response to said adjusting means for counting the number of said force increments being applied to said counteracting force and controlling the flow of pressurized fluid in a plurality of ducts in a predetermined code corresponding to said registered count.

2. Apparatus as described in claim 1 wherein said counting means includes means for representing said registered count in the binary code as a plurality of pressurized fluid signals.

3. Apparatus as described in claim 1 wherein said counting means comprises a plurality of drums rotatable in relation to the number of increments being registered, each having a plurality of tracks slotted in accordance with a predetermined code and nozzles for directing pressurized fluid against said tracks to establish fluid pressures in said nozzles representing a digital value in accordance with said code at any drum position.

4. Apparatus as described in claim 3 wherein each said drum in said counting means represents a successively higher group of denominational orders than the preceding drum and has a carry pinion interconnecting a drum with that of the next higher order group.

5. Apparatus for converting a variable fluid pressure into a digital expression thereof comprising:
   force balance means having said varying fluid pressure applied as a force urging displacement of said balance means in one direction and having a counteracting force applied to urge displacement of said balance means opposite to said one direction;
   adjusting means selectively operable in response to a first signal for increasing said counteracting force by adding force increments of predetermined value and responsive to a second signal for decreasing said counteracting force by subtracting said increments;
   means for detecting imbalance between said fluid pressure force and counteracting force and issuing said first and second control signals for said adjusting means to restore balance between said forces; and
   rotatable drum means displaceable in response to said adjusting means for counting the number of said force increments being applied to said counteracting force and controlling the flow of pressurized fluid in a plurality of ducts in a predetermined code corresponding to said registered count.

6. Apparatus for converting a variable digital value into an analog fluid pressure equivalent thereto comprising:
   force balance means having a force of pressurized fluid applied thereto urging displacement thereof in one direction and having a counteracting force applied to said balance means urging displacement in an opposite direction;
   reversible adjusting means selectively operable in response to a first signal for increasing said counteracting force by adding force increments of predetermined value and responsive to a second signal for decreasing said counteracting force by subtracting said increments;

means responsive to the operation of said adjusting means for counting the number of force increments being applied to said counteracting force and representing said number by a first plurality of pressurized fluid output signals in a predetermined code;

means for generating a second plurality of pressurized fluid output signals representing a selected number in said code;

fluid-actuated comparator means connected to said counting and said generating means for issuing a said first control signal when said counter output signals represent a number less than that represented by said generating means, and issuing a said second control signal when said counter output signals represent a number greater than said generating means;

means detecting an imbalance between said pressurized fluid force and said counteracting force and providing an indication thereof; and fluid valve means responsive to said indication for varying said fluid force to restore balance between said forces.

7. Apparatus as described in claim 6 wherein said adjusting means is operable at two incrementing speeds and said comparator means includes speed regulating means operable for selecting one of said two incrementing speeds dependent upon the difference in numbers represented by output signals from said generating means and said counting means.

8. Apparatus as described in claim 6 wherein said comparator means includes an individual fluid-actuated comparing circuit for each like denominational order of said fluid output signals, and includes means wherein each said order comparing circuit can override said first and second signals of all lower order comparing circuits when an inequality exists in that order.

9. Apparatus as described in claim 8 wherein said individual order comparing circuits each include diaphragm-controlled valves for detecting differences between signals for a particular order from said generating and counting means.

References Cited

UNITED STATES PATENTS

| | | | |
|---|---|---|---|
| 2,357,199 | 9/1944 | Holst | 73—205 |
| 2,993,370 | 7/1961 | Nye | 73—141 |
| 3,084,550 | 4/1963 | Bowditch | 73—407 |

RICHARD B. WILKINSON, *Primary Examiner.*

L. FRANKLIN, *Assistant Examiner.*